United States Patent
Matsuura (10) Patent No.: US 11,740,165 B2
(45) Date of Patent: Aug. 29, 2023

(54) MATERIAL TESTING MACHINE

(71) Applicant: Shimadzu Corporation, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 452 days.

(21) Appl. No.: 16/978,711

(22) PCT Filed: Oct. 29, 2018

(86) PCT No.: PCT/JP2018/040138
§ 371 (c)(1),
(2) Date: Sep. 7, 2020

(87) PCT Pub. No.: WO2020/089974
PCT Pub. Date: May 7, 2020

(65) Prior Publication Data
US 2021/0096048 A1    Apr. 1, 2021

(51) Int. Cl.
*G01N 3/06* (2006.01)
*G01N 3/08* (2006.01)

(52) U.S. Cl.
CPC .................. *G01N 3/06* (2013.01); *G01N 3/08* (2013.01); *G01N 3/066* (2013.01);
(Continued)

(58) Field of Classification Search
CPC ............ G01N 3/06; G01N 3/08; G01N 3/066; G01N 2203/0218; G01N 2203/0617;
(Continued)

(56) References Cited

U.S. PATENT DOCUMENTS

| | | | | |
|---|---|---|---|---|
| 2,356,763 A | * | 8/1944 | Keinath | G01N 3/08 |
| | | | | 73/792 |
| 2,756,590 A | * | 7/1956 | Clifford et al. | G01N 3/06 |
| | | | | 73/792 |
| 2006/0096385 A1 | * | 5/2006 | Wenski | G01N 3/32 |
| | | | | 73/800 |

FOREIGN PATENT DOCUMENTS

| | | | | |
|---|---|---|---|---|
| EP | 0897110 A2 | * | 2/1999 | G01N 3/10 |
| JP | H03248033 | | 11/1991 | |

(Continued)

OTHER PUBLICATIONS

"Office Action of China Counterpart Application", dated Jun. 29, 2022, with English translation thereof, pp. 1-12.

(Continued)

*Primary Examiner* — Jonathan M Dunlap
(74) *Attorney, Agent, or Firm* — JCIPRNET (57) ABSTRACT

A material testing machine is provided. The material testing machine includes a force detector that detects the testing force that acts on the target to be tested; a displacement detector that detects displacement generated in the target to be tested; and a controller that controls the load mechanism. The controller includes: a differential displacement calculator that obtains a differential displacement value from a value of the displacement detected by the displacement detector and a target displacement value that has been set in advance as a test condition; and a display controller that displays, on a display device, a differential displacement graph indicating, in a form of a graph, time-series data of the differential displacement value calculated by the differential displacement calculator.

3 Claims, 5 Drawing Sheets

(52) U.S. Cl.
CPC .............. *G01N 2203/0017* (2013.01); *G01N 2203/0218* (2013.01); *G01N 2203/0617* (2013.01); *G01N 2203/0635* (2013.01); *G01N 2203/0682* (2013.01)

(58) Field of Classification Search
CPC ... G01N 2203/0017; G01N 2203/0635; G01N 2203/0682
See application file for complete search history.

(56) References Cited

FOREIGN PATENT DOCUMENTS

| | | |
|---|---|---|
| JP | H05232002 | 9/1993 |
| JP | 2002243602 | 8/2002 |
| JP | 2004333221 | 11/2004 |
| JP | 2006010409 | 1/2006 |
| JP | 2006170959 | 6/2006 |
| JP | 4206614 | 1/2009 |
| JP | 2011169773 | 9/2011 |
| JP | 6885276 B2 * | 6/2021 |
| WO | WO-2007141839 A1 * | 12/2007 .............. G01N 3/02 |

OTHER PUBLICATIONS

"International Search Report (Form PCT/ISA/210) of PCT/JP2018/040138," dated Jan. 15, 2019, with English translation thereof, pp. 1-2.

"Written Opinion of the International Searching Authority (Form PCT/ISA/237) of PCT/JP2018/040138," dated Jan. 15, 2019, with partial English translation thereof, pp. 1-4.

"Office Action of China Counterpart Application", dated Jan. 28, 2023, with English translation thereof, p. 1-p. 11.

"Office Action of China Counterpart Application" with English translation thereof, dated Jun. 10, 2023, p. 1-p. 12.

* cited by examiner

MATERIAL TESTING MACHINE

CROSS-REFERENCE TO RELATED APPLICATION

This application is a 371 application of the international PCT application serial no. PCT/JP2018/040138, filed on Oct. 29, 2018. The entirety of each of the above-mentioned patent applications is hereby incorporated by reference herein and made a part of this specification.

TECHNICAL FIELD

The present invention relates to a material testing machine that applies a testing force to a target to be tested and conducts a material test.

BACKGROUND ART

In order to evaluate the characteristics of material, various material tests according to the type or properties of the material have been conducted. A material testing machine that conducts a material test includes a load mechanism that applies a testing force to a test piece serving as a target to be tested, and a force detector that detects a force that has actually been applied to the test piece (see Patent Literature 1). In addition, in a material testing machine that applies a high-speed tensile load to a test piece, the displacement (extension) of the test piece is measured by a high-speed camera (see Patent Literature 2) or a contact type extensometer that is attached to the test piece (see Patent Literature 3).

CITATION LIST

Patent Literature

Patent Literature 1: JP 2004-333221 A
Patent Literature 2: JP 2006-170959 A
Patent Literature 3: JP 2006-10409 A

SUMMARY OF INVENTION

Technical Problem

Figure 5:
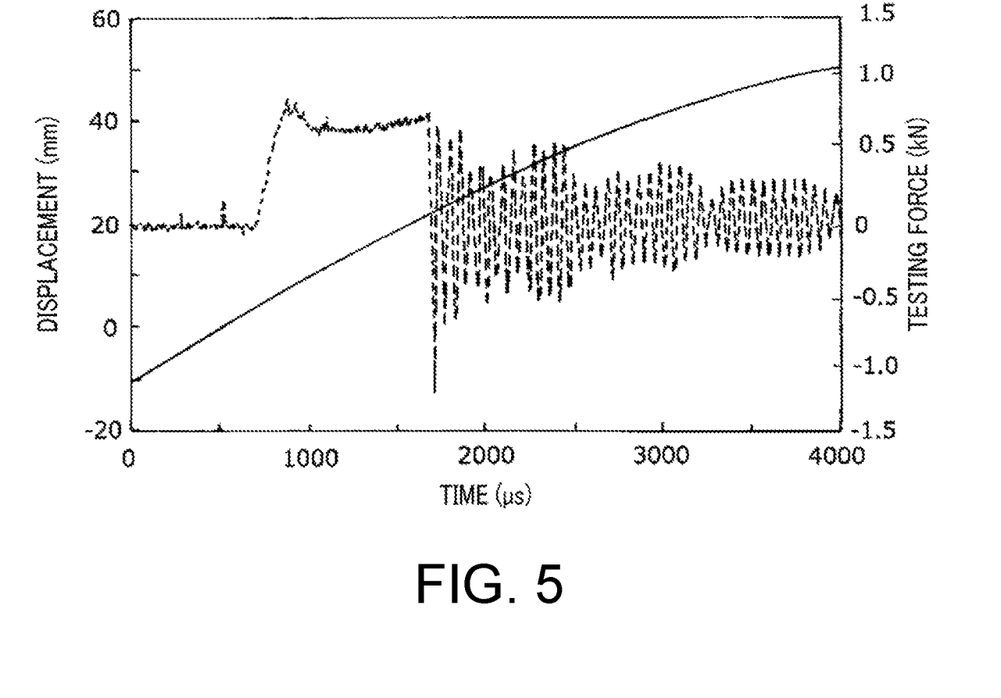
FIG. 5 is a displacement-time graph of a high-speed tensile test.
Figure 6:
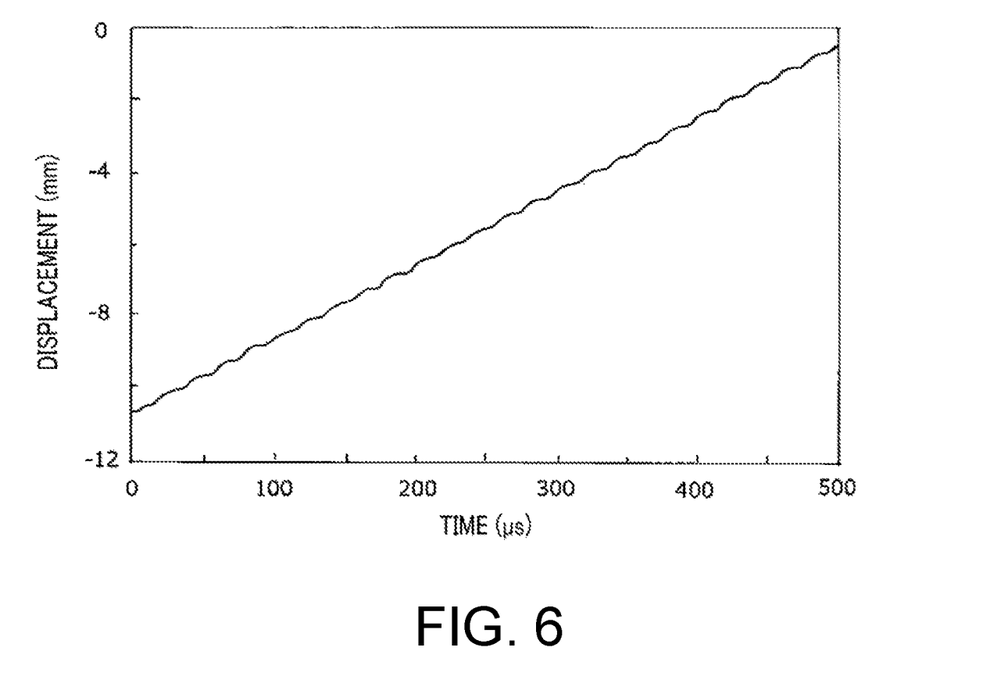
FIG. 6 is a graph obtained by enlarging part of the displacement of FIG. 5.

In a high-speed tensile test or a high-speed compression test, in order to obtain the characteristics of material for each speed, it is requested that whether a target speed has been reached be checked on the basis of a test result. FIG. 5 is a displacement-time graph of a high-speed tensile test. FIG. 6 is a graph obtained by enlarging part of the displacement of FIG. 5. These graphs indicate a relationship between displacement generated in a test piece and time at the time of conducting a tensile test under the condition of a test speed of 20 m/s. From among two vertical axes in the graph of FIG. 5, a left-hand axis indicates displacement (mm: millimeter), and a right-hand axis indicates a testing force (kN: kilonewton). In addition, a horizontal axis indicates time (μs: microsecond). In the graph, testing force data is indicated with a broken line, and displacement data is indicated with a solid line. In addition, in the graph of FIG. 6, a vertical axis indicates displacement (mm: millimeter), and a horizontal axis indicates time (μs: microsecond).

Even if a testing force detected by a force detector and displacement detected by an extensometer serving as a displacement detector are simultaneously displayed on a display device as a test result, as illustrated in FIG. 5, it is difficult to confirm that a target speed set as a test condition has been reached in an actual high-speed tensile test, by only observing the temporal progress of displacement. In addition, even if part of a displacement graph is enlarged, as illustrated in FIG. 6, it is difficult to confirm a small change in displacement.

Figure 7:
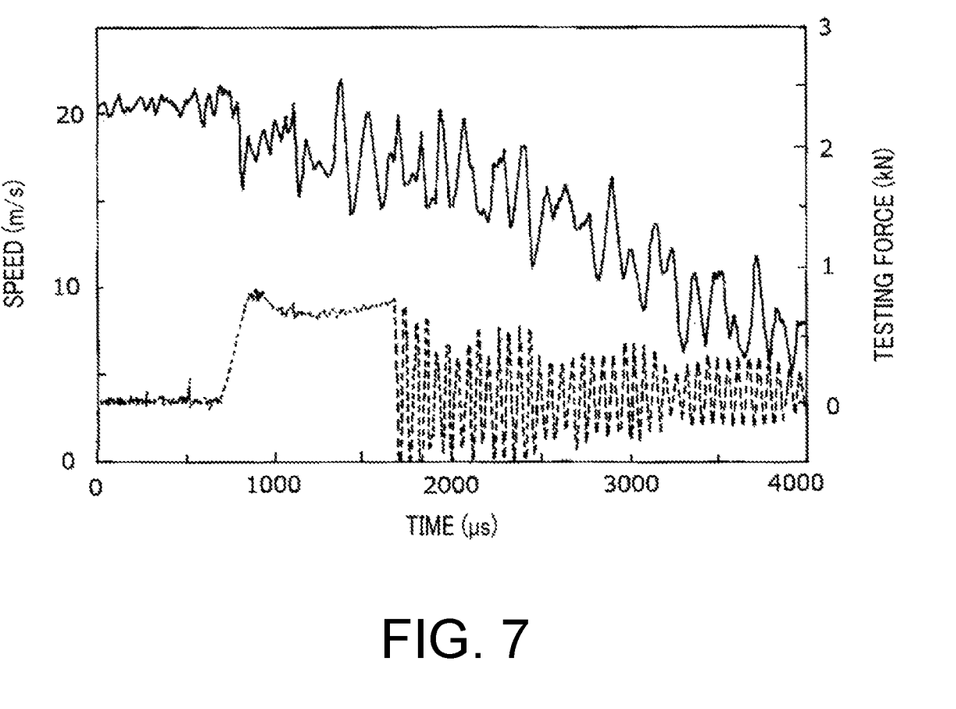
FIG. 7 is a speed-time graph of a high-speed tensile test.

FIG. 7 is a speed-time graph of a high-speed tensile test. From among two vertical axes in the graph of FIG. 7, a left-hand axis indicates speed (m/s: meter per second), and a right-hand axis indicates a testing force (kN: kilonewton). In addition, a horizontal axis indicates time (μs: microsecond). In the graph of FIG. 7, testing force data is indicated with a broken line, and speed data is indicated with a solid line.

A value of the displacement detected by the extensometer minutely changes due to disturbance or the like (see FIG. 6). In a speed-time graph obtained by differentiating displacement data to convert the displacement data into speed, a minute change in the displacement data is enlarged, and a change in speed is displayed in a large size on the graph, similarly to the speed data indicated with a solid line in the graph of FIG. 7. Therefore, in some actual high-speed tensile tests, it has been difficult to clearly determine, from a speed-time graph, whether a target speed set as a test condition has been reached.

The present invention has been made in order to solve the problem described above. It is an object of the present invention to provide a material testing machine that is capable of presenting a test result and information that enables a user to easily determine whether a target test speed has been reached.

Solution to Problem

According to an embodiment of the invention, it is to provide a material testing machine that drives a load mechanism and applies a testing force to a target to be tested. The material testing machine includes: a force detector that detects the testing force that acts on the target to be tested; a displacement detector that detects displacement generated in the target to be tested; and a controller that controls the load mechanism. The controller includes: a differential displacement calculator that obtains a differential displacement value from a value of the displacement detected by the displacement detector and a target displacement value that has been set in advance as a test condition; and a display controller that displays, on a display device, a differential displacement graph indicating, in a form of a graph, time-series data of the differential displacement value calculated by the differential displacement calculator.

According to an embodiment of the invention, in the material testing machine, the controller further includes: a point-of-interest detector that detects a point of interest from the differential displacement graph; and a reference speed straight line calculator that calculates a reference speed straight line that passes through the point of interest in the differential displacement graph, and the display controller displays, on the display device, the reference speed straight line.

According to an embodiment of the invention, in the material testing machine, the display controller adds, to the differential displacement graph, an auxiliary line according to a requested range in a test, and displays, on the display device, the differential displacement graph.

Advantageous Effects of Invention

According to an embodiment of the invention, the differential displacement value is obtained from the value of the displacement detected by the displacement detector and the target displacement value that has been set in advance as the test condition, and the differential displacement graph that indicates the time-series data of the differential displacement value in the form of a graph is displayed on the display device. Therefore, a user easily understands how a test speed is with respect to a target speed. In addition, by indicating the differential displacement value in the form of a graph, upper and lower limit values on a numerical value axis of the graph decrease. Therefore, a change in displacement is relatively enlarged, and the change in displacement is easily observed.

According to an embodiment of the invention, the point of interest is detected from the differential displacement graph, the reference speed straight line that passes through the point of interest is calculated, and the reference speed straight line is displayed on the display device. Therefore, a user easily observes various pieces of information including a test speed in a test in comparison with a displacement-time graph or a speed-time graph.

According to an embodiment of the invention, the auxiliary line according to the requested range of the test is added to the differential displacement graph, and the differential displacement graph is displayed on the display device. Therefore, a user can easily check whether an actual test speed falls within the requested range in the test.

DESCRIPTION OF EMBODIMENTS

Figure 1:
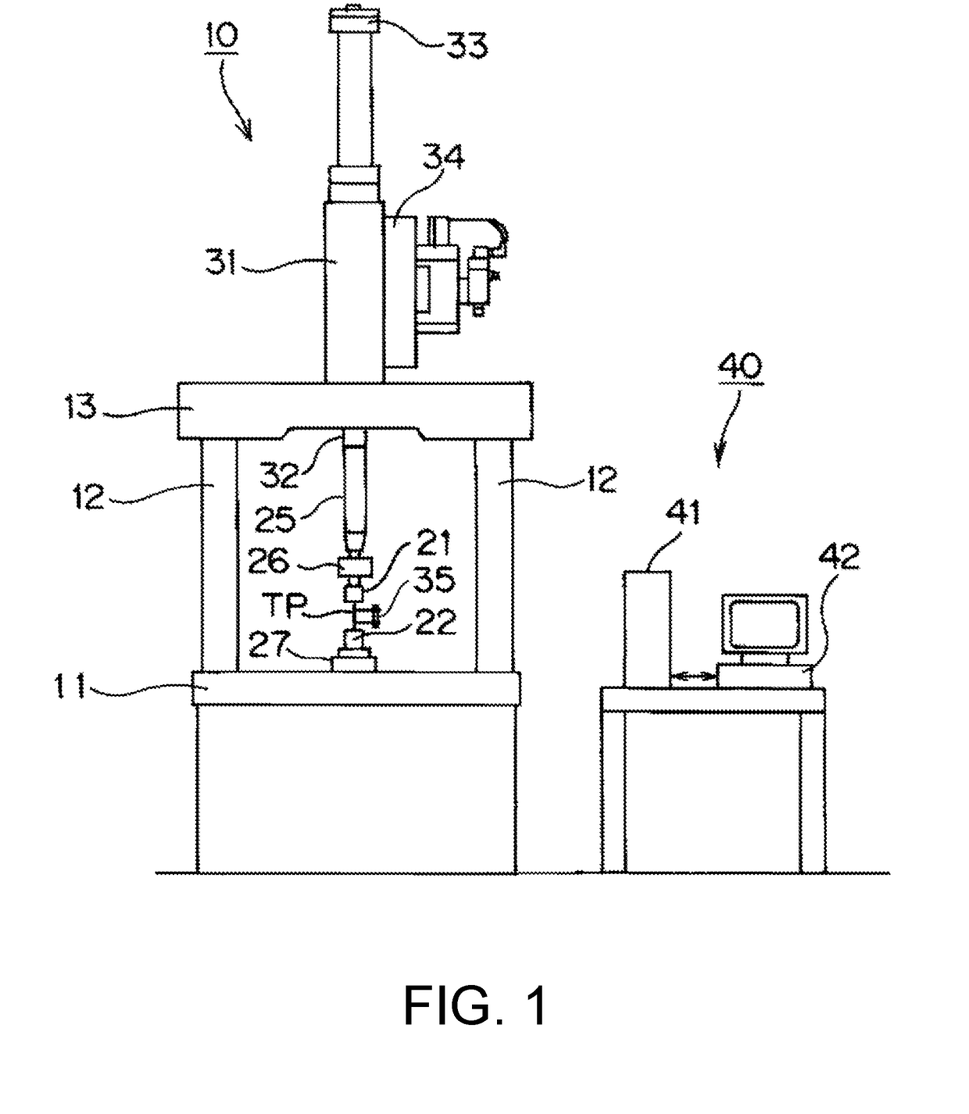
FIG. 1 is a schematic diagram of a material testing machine according to the present invention.
Figure 2:
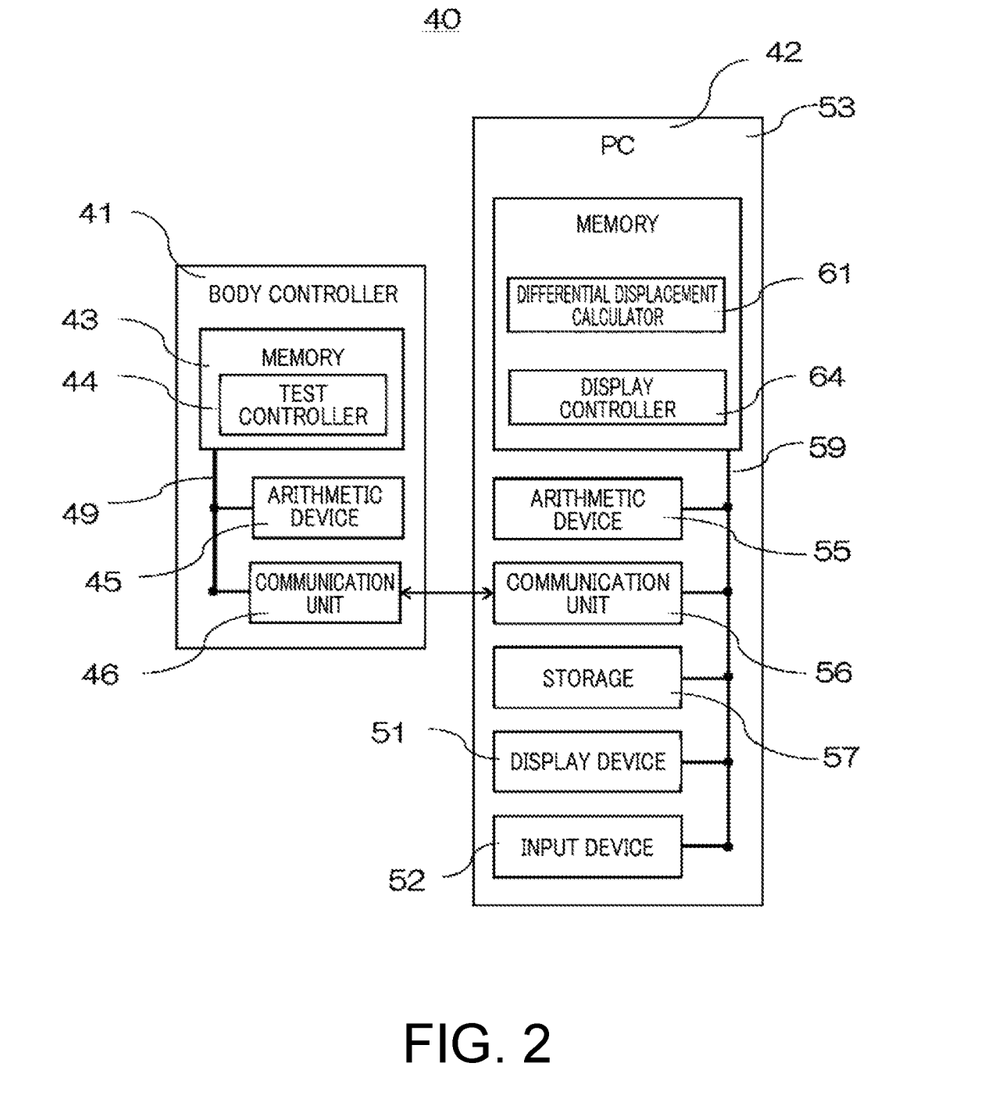
FIG. 2 is a block diagram illustrating a principle control system of the material testing machine according to the present invention.

An embodiment of the present invention is described below with reference to the drawings. FIG. 1 is a schematic diagram of a material testing machine according to the present invention. FIG. 2 is a block diagram illustrating a principle control system of the material testing machine according to the present invention.

This material testing machine conducts an impact test in which an impact load is applied on a test piece TP at high speed, and the material testing machine is also referred to as a high-speed tensile testing machine. This material testing machine includes a testing machine body 10 and a controller 40. The testing machine body 10 includes a table 11, a pair of supports 12 that are erected on the table 11, a cross yoke 13 that is bridged over the pair of supports 12, and a hydraulic cylinder 31 that is fixed to the cross yoke 13.

The hydraulic cylinder 31 is connected, via a servo valve 34, to a hydraulic source (not illustrated) that is disposed in the table 11, and operates due to hydraulic oil supplied from this hydraulic source. A piston rod 32 of the hydraulic cylinder 31 is connected, via an approach jig 25 and a joint 26, to an upper gripper 21. On the other hand, the table 11 is connected, via a load cell 27 serving as a force detector, to a lower gripper 22. As described above, this testing machine body 10 is configured to conduct a tensile test in which the pair of grippers that grip both ends of the test piece TP are suddenly separated from each other, by using the approach jig 25 to provide an approach zone in a tensile direction and pulling up the piston rod 32 at a high speed ranging from 0.1 m/s to 20 m/s. The displacement (a stroke) of a load mechanism at the time of conducting the tensile test, i.e., an amount of movement of the piston rod 32, is detected by a stroke sensor 33, and a testing force in this test is detected by the load cell 27.

In addition, the test piece TP is provided with an extensometer 35 serving as a displacement detector according to the present invention. The extensometer 35 is directly attached to the test piece TP in order to measure the extension of the test piece TP, and the extensometer 35 has, for example, the structure described in JP 2006-10409 A. Stated another way, the extensometer 35 includes fixing tools that are respectively fixed along two reference lines that have been set in the test piece TP, a pipe including a conductor that is fixedly attached to one of the fixing tools, and a coil that is movably inserted into a pipe that is fixedly attached to the other of the fixing tools. The extensometer 35 detects a change in inductance of the coil based on a change in an amount of insertion of the coil into the pipe, and measures the extension between the reference lines of the test piece TP. The displacement detector according to the present invention may be the stroke sensor 33, or may be a non-contact type extensometer such as a high-speed video camera.

The controller 40 includes a body controller 41 that controls the operation of the testing machine body 10, and a personal computer 42. The body controller 41 includes a memory 43 that stores a program, an arithmetic device 45, such as a micro processing unit (MPU), that performs various arithmetic operations, and a communication unit 46 that performs communication with the personal computer 42. The memory 43, the arithmetic device 45, and the communication unit 46 are connected to each other via a bus 49. The body controller 41 also includes a test controller 44 as a functional configuration. The test controller 44 is stored as a test control program in the memory 43. When a high-speed tensile test is conducted, a control signal is supplied to the servo valve 34 by executing the test control program, and the hydraulic cylinder 31 operates. An output signal of the stroke sensor 33, an output signal of the load cell 27, and an output signal of the extensometer 35 are captured in the body controller 41 at prescribed time intervals.

The personal computer 42 includes a memory 53 that includes a ROM that stores a data analysis program, a RAM into which a program is loaded at the time of the execution of the program and that transitorily stores data, or the like, an arithmetic device 55, such as a central processing unit (CPU), that performs various arithmetic operations, a communication unit 56 that performs communication with an external connection device such as the body controller 41, a storage 57 that stores data, a display device 51 on which a test result is displayed, and an input device 52 that is used to input a test condition. In the memory 53, a program for causing the arithmetic device 55 to operate to achieve functions is stored. The storage 57 is a storage unit that stores, for example, time-series data that has been input from the load cell 27 and serves as raw data of a testing force, and the storage 57 includes a large-capacity storage such as a hard disk drive (HDD). The memory 53, the arithmetic device 55, the communication unit 56, the storage 57, the display device 51, and the input device 52 are connected to each other via a bus 59.

In FIG. 2, programs that have been installed in the personal computer 42 and has been stored in the memory 53 are illustrated as functional blocks. In this embodiment, a differential displacement calculator 61, a display controller 64, a point-of-interest detector 62, and a reference speed straight line calculator 63 are included as the functional blocks. The differential displacement calculator 61 calculates a differential displacement value that is a difference between the extension (an actual displacement amount) of the test piece TP that has been input from the extensometer 35 and a target displacement value that has been input in advance. The display controller 64 displays, on a display device, the differential displacement value together with testing force data. The point-of-interest detector 62 detects a point of interest from a differential displacement graph in which time-series data of the differential displacement value with respect to a target is indicated in the form of a graph. The reference speed straight line calculator 63 calculates a reference speed straight line that passes through the point of interest in the differential displacement graph.

Figure 3:
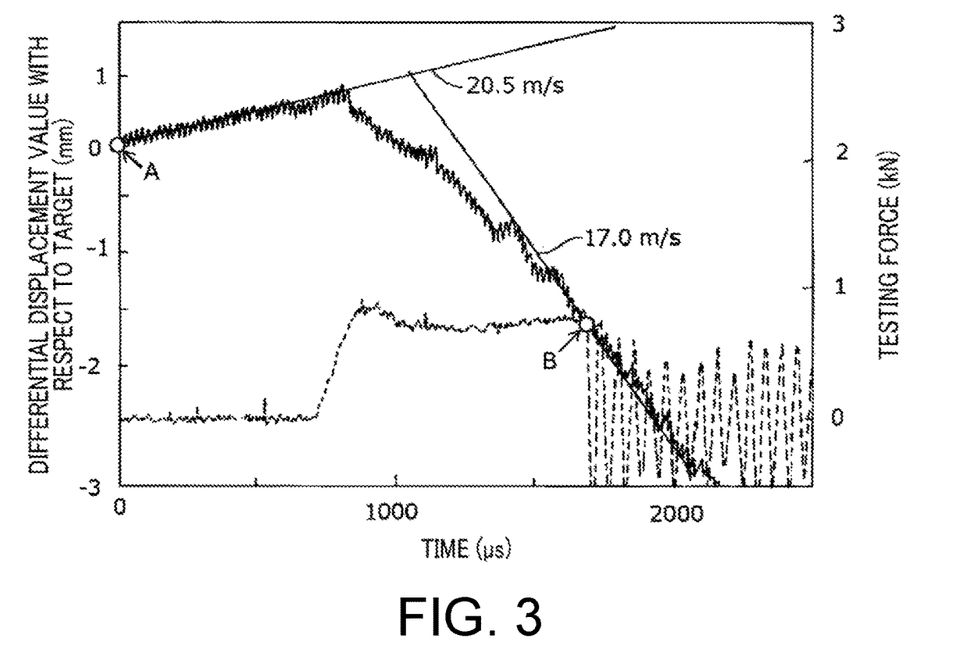
FIG. 3 illustrates a display example of a graph indicating a test result.

A display of a test result on the display device 51 at the time of conducting a high-speed tensile test in the material testing machine having such a configuration is described. FIG. 3 illustrates a display example of a graph indicating a test result. This test result indicates a relationship between differential displacement and time at the time of conducting a tensile test under the condition of a test speed of 20 m/s. A testing force is also displayed as a reference. From among two vertical axes in the graph, a right-hand axis indicates a testing force (kN: kilonewton), and a left-hand axis indicates a differential displacement value with respect to a target (mm: millimeter). In addition, a horizontal axis indicates time (μs: microsecond). In the graph, testing force data is indicated with a broken line, and displacement data is indicated with a solid line.

The differential displacement value is a value obtained by subtracting a target displacement value from an actual displacement value, and in other words, a displacement value indicating a difference. From the viewpoint of a display in a graph, in order to have an inclination of 0 (zero) on the graph in the case of operation at a target speed, a target displacement value is subtracted from a displacement value detected by the extensometer 35 (a detected displacement value), and offset processing is further performed in such a way that a starting point is an origin. The arithmetic device 55 executes programs that have been read from the differential displacement calculator and the display controller 64 in the memory 53, and therefore the calculation of the differential displacement value and the display of the differential displacement graph are achieved. The differential displacement value is obtained according to Formula (1) described below.

$$\text{Differential displacement value} = \text{detected displacement value} - \text{target displacement value} \quad (1)$$

In this formula, the target displacement value is the product of a target speed set in advance and time.

In addition, the starting point is a point of interest according to the present invention at the time of the start of a test. The arithmetic device 55 executes a program that has been read from the point-of-interest detector 62 in the memory 53, and therefore the detection of the point of interest is achieved. Further, the arithmetic device 55 executes a program that has been read from the reference speed straight line calculator 63 in the memory 53, and therefore the calculation of a reference speed straight line that passes through the point of interest is achieved. The reference speed straight line can be obtained according to Formula (2) described below.

$$\text{Reference speed straight line} = (\text{time} - \text{time of interest}) \times (\text{reference speed} - \text{target speed}) + b \quad (2)$$

In this formula, b is a differential displacement value at the time of interest. The time of interest is the time of a data point that has been detected as a point of interest in the graph. In the case of a reference speed straight line on which the point of interest is a starting point A, the reference speed is an initial speed. In the case of a reference speed straight line on which the point of interest is a fracture point B, the reference speed is a speed at the time of fracture. Then, the display controller 64 draws the calculated reference speed straight line in the graph.

When a test is started and the piston rod 32 is pulled up, the load cell 27 detects a testing force applied to the test piece TP. According to an increase in the testing force applied to the test piece TP, the test piece TP is displaced, and the extension of the test piece TP that is detected by the extensometer 35 attached to the test piece TP increases. Therefore, in a graph displayed as a test result on the display device 51, a differential displacement value with respect to a target also increases. In the example of FIG. 3, a target speed is 20 m/s; whereas, it can be confirmed that an average speed in an actual test is 20.5 m/s at and before 800 μs, then, the average speed decreases after about the time when testing force data indicates a maximum testing force, and the average speed becomes lower than the target speed.

As described above, by displaying, on the display device 51, a graph indicating differential displacement with respect to a target and a reference speed straight line, a user can easily check various pieces of information in comparison with the displacement-time graph illustrated in FIG. 5 and the speed-time graph illustrated in FIG. 7.

In the embodiment described above, a reference speed straight line that passes through a point of interest is displayed. However, a user can grasp how a test speed is with respect to a target speed without detecting such a point of interest, calculating a reference speed straight line, and displaying the reference speed straight line. Stated another way, as described above, the differential displacement value is obtained by subtracting a target displacement value from a displacement value detected by the extensometer 35 and further performing offset processing in such a way that a starting point is an origin, so that a target speed has an inclination of 0 (zero). Therefore, in the graph illustrated in FIG. 3 that indicates differential displacement with respect to a target, a horizontal line at a differential displacement value of 0 (zero) with respect to a target corresponds to a target speed line. Accordingly, by determining whether a tendency of a change in time-series data indicated as the graph has an upward inclination or a downward inclination with respect to the horizontal line at a differential displacement value of 0 (zero) with respect to a target, a user can grasp how the test speed is with respect to the target speed.

In addition, in the differential displacement graph, upper and lower limit values of the entire data (a vertical-axis scale in the graph) decrease, and a change in displacement is relatively enlarged. For example, in the displacement graph illustrated in FIG. 5 that indicates an output of the extensometer 35, a vertical axis has a minimum value of −20 mm and a maximum value of 60 mm. In contrast, in the graph illustrated in FIG. 3 that indicates differential displacement with respect to a target, a vertical axis has a minimum value of −3 mm and a maximum value of 1.5 mm. As described above, the differential displacement graph is displayed in a state where a change in displacement has been relatively enlarged. Therefore, a user easily reads the degree of change in displacement or noise from the differential displacement graph in comparison with the conventional graphs illustrated in FIGS. 5 and 6.

Figure 4:
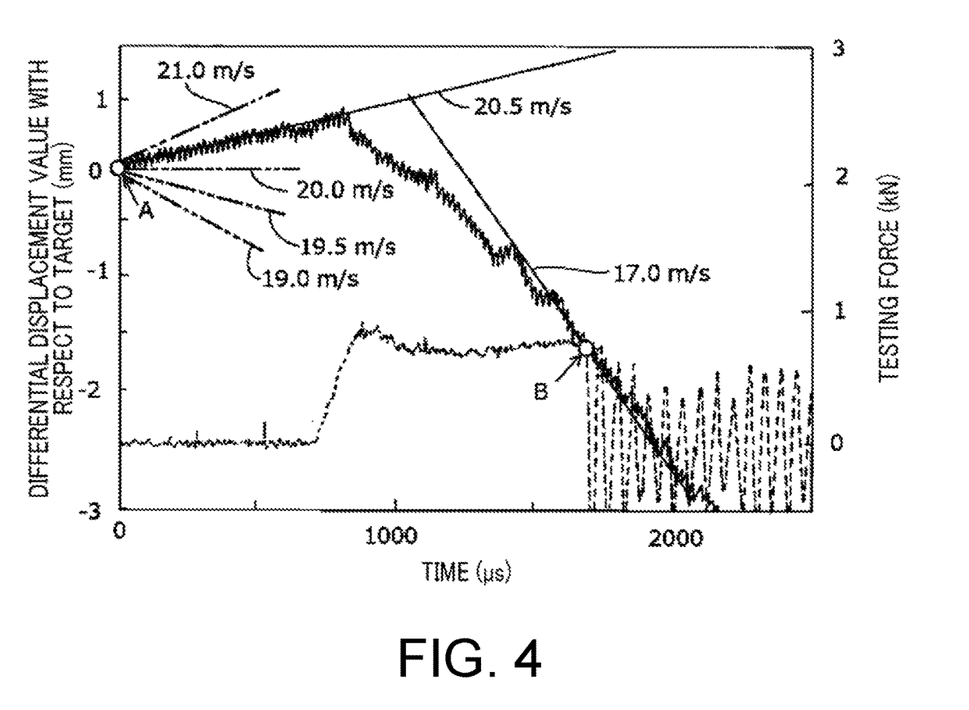
FIG. 4 illustrates a display example obtained by adding auxiliary lines to the graph of FIG. 3.

FIG. 4 illustrates a display example obtained by adding auxiliary lines to the graph of FIG. 3.

For example, in a case where a test has a requested range, such as an initial speed falling within a range of 10% of a target speed of 20 m/s, in order to indicate the requested range, a speed auxiliary line indicating 19.5 m/s, 19.0 m/s, or the like may be additionally displayed, as illustrated with an alternating long and two short dashed line in the graph of FIG. 4.

The auxiliary line is not limited to the auxiliary line illustrated in FIG. 4 that relates to the initial speed. Stated another way, the speed in an actual test changes according to time, as is apparent from a difference in inclination between the reference speed straight line with the starting point A as a point of interest and the reference speed straight line with the fracture point B as a point of interest. Accordingly, instead of an auxiliary line using a point of interest as a starting point, for example, an allowable range of differential displacement serving as the basis of the calculation of speed, or the like may be indicated in a belt shape along time-series data.

In the embodiment described above, a high-speed tensile test has been described. However, the present invention can be applied in order to confirm that a target speed has been reached in a test such as a high-speed compression test in which a compression load is applied to a test specimen such as concrete. The present invention can also be applied to, for example, a tensile test having a range of speed that cannot be said to be high speed.

The invention claimed is:

1. A material testing machine that drives a load mechanism and applies a testing force to a target to be tested, the material testing machine comprising:
    a force detector that detects the testing force that acts on the target to be tested;
    a displacement detector that detects displacement generated in the target to be tested; and
    a controller that controls the load mechanism, wherein the controller comprises:
    a differential displacement calculator that obtains a differential displacement value from a value of the displacement detected by the displacement detector and a target displacement value that has been set in advance as a test condition; and
    a display controller that displays, on a display device, a differential displacement graph indicating, in a form of a graph, time-series data of the differential displacement value calculated by the differential displacement calculator.

2. The material testing machine according to claim 1, wherein
    the controller further comprises:
    a point-of-interest detector that detects a point of interest from the differential displacement graph; and
    a reference speed straight line calculator that calculates a reference speed straight line that passes through the point of interest in the differential displacement graph, and
    the display controller displays, on the display device, the reference speed straight line.

3. The material testing machine according to claim 1, wherein
    the display controller adds, to the differential displacement graph, an auxiliary line according to a requested range in a test, and displays, on the display device, the differential displacement graph.

* * * * *